3,658,991
ANTI-INFLAMMATORY METHODS USING DE-
RIVATIVES OF 2-MERCAPTOIMIDAZOLES
Karl J. Doebel, Ossining, N.Y., and Andre R. Gagneux, Basel, Switzerland, assignors to Ciba-Geigy Corporation, Ardsley, N.Y.
No Drawing. Continuation-in-part of application Ser. No. 721,930, Apr. 17, 1968, which is a continuation-in-part of application Ser. No. 500,245, Oct. 21, 1965. This application Nov. 7, 1969, Ser. No. 874,948
Int. Cl. A61k 27/00
U.S. Cl. 424—273    3 Claims

ABSTRACT OF THE DISCLOSURE

A method and compositions for producing antiinflammatory effects in warm-blooded animals by administration of an effective amount of a derivative of 2-mercaptoimidazoles, such as, for example 1-(4-methoxyphenyl)-2-methylmercapto-5-methylimidazole.

CROSS-REFERENCE TO RELATED CASES

This application is a continuation-in-part of application Ser. No. 721,930 filed Apr. 17, 1968, now U.S. Pat. No. 3,505,350, which is a continuation-in-part of application Ser. No. 500,245 filed Oct. 21, 1965, now abandoned.

DETAILED DISCLOSURE

This invention relates to a process for producing anti-inflammatory effects in warm-blooded animals, particularly mammals, by administering to them certain derivatives of 2-mercaptoimidazole in effective amounts. This invention pertains also to pharmaceutical compositions containing such 2-mercaptoimidazole derivatives.

More specifically, the process of this invention employs substituted 2-mercaptoimidazole derivatives which can be represented by the following formula:

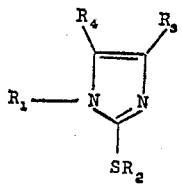

wherein $R_1$ is lower alkyl; lower alkenyl; cycloalkyl; cycloalkyl-lower alkyl; monocarbocyclic aryl; monocarbocyclic aryl-lower alkyl; di-lower-alkyl; amino-lower alkyl or lower alkoxy-lower alkyl;
$R_2$ is lower alkyl
$R_3$ is hydrogen or lower alkyl, and
$R_4$ is hydrogen, lower alkyl, or monocarbocyclic aryl or a pharmaceutically acceptable acid adidtion salt thereof.

The term "lower alkyl" as used herein per se or as included in the term "lower alkoxy" and "lower alkenyl" means saturated monovalent aliphatic radicals of the formula —$C_mH_{2m+1}$ wherein $m$ designates an integer of less than 5 and is inclusive of both straight chain and branched chain radicals except that the integer is less than 4 in "carbo(lower)alkoxy," the term "lower alkylene" as used herein means unsaturated monovalent aliphatic radicals of the formula —$C_nH_{2n-1}$ wherein $n$ designates an integer of less than 5 and is inclusive of both straight chain and branched chain radicals and the term "monocarbocyclic aryl" as used herein means phenyl and phenyl mono-, di- or tri-substituted by lower alkyl, lower alkoxy, halogen (fluorine, bromine, chlorine, iodine) or trifluoromethyl.

The compounds defined by the above formula can be synthesized, for example, by alkylating compounds wherein $R_2$ is hydrogen by means of an alkylating agent such as, for instance, alkyl halide. The preparation of compounds wherein $R_2$ is hydrogen is described in copending application Ser. No. 721,930, filed Apr. 17, 1968, now U.S. Pat. No. 3,505,350. Other modes of preparation of the compounds of this invention are illustrated in the examples given below.

The present invention comprehends not only the above described derivatives of 2-mercaptoimidazole in its free base form, but it also includes pharmaceutically acceptable non-toxic acid addition salts which may be formed from said compounds in those cases where, e.g. $R_1$ or $R_2$ are basic amino substituents in accordance with conventional practice, by using appropriate inorganic and organic acids, such as hydrohalic acids, especially hydrochloric and hydrobromic acids, sulfuric, ethanesulfonic and phosphonic acids as well as acetic, aminoacetic, lactic, succinic, malic, aconitic, phthalic, tartaric acids, etc.

The methods for the preparation of these compounds can be exemplified more fully by the following illustrative examples. The temperatures therein are given in degrees centigrade.

Example 1.—1-(4-methoxyphenyl)-2-methylmercapto-5-methylimidazole hydrochloride

1 - (4 - methoxyphenyl)-2-mercapto-5-methylimidazole (4.4 g., 0.02 mole) was suspended in water (20 ml.) and 3 N NaOH (6.6 ml.); the mixture was heated to 100° and dimethyl sulfate (0.04 mole, 5.66 ml.) was added. Sufficient dilute NaOH solution was added to maintain reaction mixture just basic to bromcresol purple indicator while heating at 100° for one-half hour. The reaction mixture was cooled, neutralized to pH 8–9 with saturated sodium carbonate solution and extracted with chloroform (5× 100 ml.). The chloroform extract was washed with water, dried over sodium sulfate and evaporated to dryness. The resulting oil (4.4 g.) was dissolved in isopropanol-isopropyl ether (1:1, 15 ml.) and ethanolic HCl (10 N, 2.5 ml.) was added. The desired product crystallized (1.4 g., M.P. 210–211°). The crude product from several reactions (4.0 g.) was recrystallized from isopropanol (30 ml.) to yield screening sample 3.5 g., M.P. 211–213° (dec.).

Analysis.—For $C_{12}H_{15}ClN_2OS$ (M.W. 270–79). Calc'd. (percent): C, 53.22; H, 5.58; N, 10.35; S, 11.84; Cl, 13.09. Found (percent): C, 53.00; H, 5.48; N, 10.39; S, 11.90; Cl, 13.36.

Ultraviolet spectrum: $\lambda_{max.}^{MeOH}$ 225 m$\mu$, 255 m$\mu$

Example 2.—1,5-dimethyl-2-(methylmercapto) imidazole hydrochloride

A solution of 1,5-dimethyl-2-mercaptoimidazole (10.2 g., 0.08 mole) and methyl iodide (22.7 g., 0.24 mole, 9.9 ml.) in anhydrous methanol (200 ml.) was heated under reflux for two hours. The solution was evaporated to dryness. The residue was suspended in water (80 ml.) and the pH was adjusted to 9–10 with saturated sodium carbonate solution. The aqueous mixture was extracted with chloroform (4× 200 ml.), the chloroform extract was washed with water, dried over sodium sulfate and evaporated to dryness to give oil (11 g.). To a solution of the oil in isopropanol was added 9 N ethanolic HCl (12 ml.) while cooling. The resulting solution was evaporated to dryness and the residue crystallized from isopropanol-isopropyl ether (3:1, 20 ml.) to give desired compound (12.3 g., M.P. 142–144°). Recrystallization from isopropanol-isopropyl ether (2:1, 30 ml.) yielded screening sample (11.3 g., M.P. 141–143°).

*Analysis.*—For $C_6H_{11}ClN_2S$ (M.W. 178.70). Calc'd. (percent): C, 40.32; H, 6.20; N, 15.68; S, 17.94; Cl, 19.84. Found (percent): C, 40.14; H, 6.29; N, 15.42; S, 17.87; Cl, 19.86.

Example 3.—1-(4-fluorophenyl)-4-methyl-2-ethyl-mercaptoimidazole hydrochloride (a) α-Aminopropionaldehyde diethylacetal.—α-Aminopropionaldehyde diethylacetal was prepared from α-bromopropionacetal as described by R. Burtles et al., J. Chem. Soc., 1925, 581.

(b) Desired compound.—A mixture of α-aminopropionaldehyde diethylacetal (11.76 g., 0.08 mole), p-fluorophenyl isothiocyanate (12.24 g., 0.08 mole) in anhydrous benzene (80 ml.) was heated under reflux for one-half hour. The solution was evaporated to dryness; hydrochloric acid (6 N, 80 ml.) was added and the mixture was heated under reflux for 17 hours. Product corresponding to 1-(p-fluorophenyl)-4-methyl-2-mercaptoimidazole (0.7 g., M.P. 212–213°) crystallized on cooling. The mother liquor was extracted with chloroform (3 × 75 ml.); the chloroform extract was evaporated to dryness and the residue was crystallized from ethylacetate (50 ml.) to give title compound (16.2 g., M.P. 159–161° dec.). A portion of this hydrochloride salt (9.0 g.) was dissolved in water, the solution was rendered basic to pH 9 with saturated sodium carbonate solution and extracted with chloroform to give oil (7.4 g.). This was redissolved in isopropanol (reagent grade, 10 ml.), ethanolic hydrochloric acid (9.9 N, 3.5 ml.) was added, and title compound (6.4 g., M.P. 160–162° dec.) crystallized. Recrystallization from isopropanol (10 ml.) gave screening sample (4.8 g., M.P. 159–161° dec.).

Thin layer chromatography: 95 $CHCl_3$, 5 3A EtOH.

*Analysis.*—For $C_{12}H_{14}ClFN_2S$ (M.W. 272.78). Calc'd. (percent): C, 52.83; H, 5.17; N, 10.27; S, 11.76; Cl, 13.00. Found (percent): C, 53.06; H, 5.34; N, 10.28; S, 11.90; Cl, 13.01.

Ultraviolet spectrum: $\lambda_{max.}^{MeOH}$ 264 mμ (ε, 6.500)

Example 4.—1-methyl-5-(p-chlorophenyl)-2-methyl-mercaptoimidazole hydrochloride A solution of 1-methyl-5-p-chlorophenyl-2-mercaptoimidazole prepared as described in Example 1 (0.11 mole, 24.8 g.) and methyl iodide (0.33 mole, 46.86 g.) in anhydrous methanol (275 ml.) was heated under reflux for 2 hours, cooled and evaporated to dryness. The residue was suspended in 100 ml. of water and the suspension made basic to pH 9–10 with saturated sodium carbonate solution. The suspension was extracted with chloroform (400 ml.) and the chloroform solution was washed with water dried over sodium sulfate and evaporated to dryness. The product was dissolved in isopropanol, the solution was cooled and treated with 6.52 N ethanolic hydrochloric acid (22.9 ml.). The hydrochloride salt crystallized, was filtered off and washed with isopropanol. Yield: 26.19 g., M.P. 195–199° C. Recrystallization from isopropanol (200 ml., treatment with G–60 and KB charcoal) yielded purer product (22.49 g., M.P. 199–202° C.). One additional recrystallization from ethanol 2B (G–60 and KB charcoal treatment, 100 ml.) yielded screening sample (13.9 g., M.P. 200–2° C.).

1-methyl-5-(p-chlorophenyl)-2-methyl-mercaptoimidazole 1-methyl-5-(p-chlorophenyl) - 2 - methylmercaptoimidazole hydrochloride (2.0 g.) was dissolved in water, the solution was cooled and made basic to pH 9 with saturated sodium carbonate solution. The free base was filtered off and washed with water to give product (1.63 g., M.P. 89–90° C.). One recrystallization from cyclohexane gave analytical sample (1.04 g., M.P. 90–91° C.).

*Analysis.*—For $C_{11}H_{11}ClN_2S$. Calc'd. (percent): C, 55.34; H, 4.65; N, 11.73; Cl, 14.86; S, 13.43. Found (percent): C, 55.47; H, 4.63; N, 11.66; Cl, 14.85; S, 13.44.

Example 5.—1,4-dimethyl-5-(p-chlorophenyl)-2-(methylmercapto)imidazole hydrochloride A solution of 11.90 g. of 5-(p-chlorophenyl)-1,4-dimethyl-2-mercaptoimidazole and 21.30 g. of methyliodide in 125 ml. of anhydrous methanol was heated under reflux for 2 hours, cooled and evaporated to dryness. The residue was suspended in water and made basic to pH 9–10 with a saturated sodium carbonate solution. The suspension was extracted with chloroform, dried over sodium sulfate and evaporated to dryness. The product was dissolved in isopropanol, cooled and treated with 8.72 ml. of 6.52 N ethanolic hydrochloric acid and evaporated to dryness. On recrystallization from 330 ml. of a mixture of isopropanol and hexane in a proportion of 1:3, 11.87 g. of the desired compound was obtained, M.P. 199–201° C.

*Analysis.*—For $C_{12}H_{14}Cl_2N_2S$. Calc'd. (percent): C, 49.83; H, 4.88; N, 9.68; Cl, 24.52; S, 11.09. Found (percent): C, 49.71; H, 4.86; N, 9.68; Cl, 24.35; S, 10.90.

As indicated above, the compounds described hereinabove can be employed as anti-inflammatory agents to treat the four cardinal symptoms of inflammation: swelling, redness, pain and heat. The compounds of the present invention also exhibit analgesic and anti-pyretic properties. The anti-inflammatory and analgesic effects in warm-blooded animals were determined by carrageenin, UV erythema and hot box tests as follows:

(a) Anti-inflammatory: carrageenin test.—Male rats, five per group, weighing between 150–200 g., were given the test compounds orally one hour before carrageenin. 0.1 cc. of carrageenin was injected into the plantar area of the right hind paw. Three hours after administration of carrageenin and four hours after administration of test compounds or vehicle, the rats were sacrificed. Right and left hind paws were removed and weighed. The difference between these paws was determined for all animals within a group and the average difference calculated. The average difference of the vehicle control group was used as a point of comparison for test groups. If the average difference for a test group was smaller than that of the vehicle control, protection is present and is expressed in percentage of vehicle control. The following illustrative results were obtained.

TABLE I

| Test compound | Dose, p.o. (mg./kg.) | Percent protection |
|---|---|---|
| 5-(p-chlorophenyl)-1,4-dimethyl-2-methyl-mercaptoimidazole hydrochloride | 100 | 46 |
| 1-methyl-5-(p-chlorophenyl)-2-methylmercaptoimidazole hydrochloride | 100 | 16 |
|  | 300 | 42 |

(b) Anti-inflammatory: ultra violet erythema test.—Guinea pigs, either sex, five per group, weighing between 275–375 grams, having their hair removed by using animal electrical clippers followed by chemical depilation with Nair. The next morning test compounds are given orally. Half of the total dose is given one hour before ultra violet irradiation. The other half is given immediately after UV exposure. Erythema is produced by 60 second exposure to ultra violet rays emitted by a Hanovia Analytical Model Quartz Lamp with a 500 watt high pressure mercury burner. In order to localize erythema to three 7 mm. areas, guinea pigs are confined in rubber gloves with three 7 mm. holes cut in them. Evaluation of results takes place 2 hours and 24 hours after ultra violet exposure. Erythema spots are scored from 0 to 3 giving a maximum total of 9 for an unprotected animal.

0 = No visible signs of erythema
1 = Faint trace of erythema
2 = Definite but ill defined area of erythema
3 = Definite and clearly defined area of erythema The scores of all animals within a given group are added together. A maximum score for any group of animals is 45 and is called the Maximum Degree of Inflammation. Any group with a degree of inflammation greater than vehicle control has 0% protection. Groups with values less than the control groups have protection and this is expressed in percent. Table II shows illustrative results.

TABLE II

| Test compound | Dose (mg./kg.) | Percent protection |
|---|---|---|
| 1-(4-fluorophenyl)-4-methyl-2-ethylmercaptoimidazole hydrochloride | 100 | 21 |

Analgesic activity: hot box test.—The mice are placed on copper plates at room temperature. The plates are heated by a hot plate. "Pain threshold" is reached when the hind limbs exhibit a sequence of rapid withdrawal reflexes. Male Charles River mice weighing 18–30 g., four per group, are used. The mice are fasted for 4 hours; two control readings are taken 30 minutes apart. Following oral administration, readings are taken at 30, 60, 90 minutes or more depending on the activity and duration of the compounds. Table III gives illustrative results.

TABLE III

| Test compound | Dose (mg./kg.) | Percent protection |
|---|---|---|
| 1-(4-methoxyphenyl)-5-methyl-2-methylmercaptoimidazole | 80 | 24 |
| 1-(4-fluorophenyl)-4-methyl-2-ethylmercaptoimidazole hydrochloride | 50 | 18 |

The amount of these compounds which is administered in use to effect an anti-inflammatory response must in all cases be adjusted to the mammal being treated, its age, weight and condition, as well as the degree of response required. Thus, while an anti-inflammatory response is observed in the range of about 0.1 mg./kg. to about 300 mg./kg., preferably about 1 mg./kg. to about 100 mg./kg., the actual dose should be carefully titrated to the particular subject in accordance with the well-recognized principles of pharmacology.

What is claimed is:

1. A process which comprises orally administering to a warm-blooded animal suffering from an inflammatory condition an effective amount of a 2-mercaptoimidazole compound of the formula

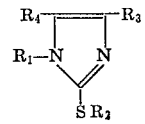

wherein $R_1$ is lower alkyl, phenyl or phenyl substituted by lower alkoxy or halogen;

$R_2$ is lower alkyl;

$R_3$ is hydrogen or lower alkyl; and $R_4$ is lower alkyl, phenyl or phenyl substituted by lower alkoxy or halogen or a pharmaceutically acceptable acid addition salt thereof.

2. A process according to claim 1 in which the compound is 1-methyl-5-(p-chlorophenyl)-2-methylmercaptoimidazole.

3. A process according to claim 1 in which the compound is 1,4-dimethyl-5-(p-chlorophenyl)-2-methylmercaptoimidazole.

References Cited

UNITED STATES PATENTS 2,519,310  8/1950  Dessert _____ 260—309

STANLEY J. FRIEDMAN, Primary Examiner